US009530256B2

(12) United States Patent
Ahn et al.

(10) Patent No.: US 9,530,256 B2
(45) Date of Patent: Dec. 27, 2016

(54) GENERATING CUMULATIVE WEAR-BASED INDICATORS FOR VEHICULAR COMPONENTS

(71) Applicant: International Business Machines Corporation, Armonk, NY (US)

(72) Inventors: Hyung-il Ahn, San Jose, CA (US); Matthew Denesuk, Ridgefield, CT (US); Axel Hochstein, San Jose, CA (US); Ying Tat Leung, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/978,438

(22) Filed: Dec. 22, 2015

(65) Prior Publication Data

US 2016/0110933 A1 Apr. 21, 2016

Related U.S. Application Data

(62) Division of application No. 14/498,686, filed on Sep. 26, 2014, now Pat. No. 9,286,735.

(51) Int. Cl.
*G06F 7/00* (2006.01)
*G07C 5/08* (2006.01)
(Continued)

(52) U.S. Cl.
CPC .............. *G07C 5/08* (2013.01); *G05B 23/00* (2013.01); *G06N 7/005* (2013.01); *G06N 99/005* (2013.01);
(Continued)

(58) Field of Classification Search
CPC .......... G07C 5/006; G07C 5/08; G07C 5/008; G07C 5/02; G07C 5/0808; G05B 23/00; G06N 7/005; G06N 99/005
(Continued)

(56) References Cited

U.S. PATENT DOCUMENTS 5,280,223 A   1/1994   Grabowski
5,791,441 A   8/1998   Matos et al.
(Continued)

FOREIGN PATENT DOCUMENTS

CN   103778339 A   5/2014
EP   0126402 A2   11/1984
(Continued)

OTHER PUBLICATIONS

IP.com, Method for Visual Life Indication of Flash Based Storage Devices, IPCOM000236342D, Apr. 21, 2014.
(Continued)

*Primary Examiner* — Ian Jen
(74) *Attorney, Agent, or Firm* — Ryan, Mason & Lewis, LLP

(57) ABSTRACT

Methods, systems, and computer program products for generating wear-based indicators are provided herein. A method includes assigning a failure label to each data point associated with a component associated with a failure-caused component replacement within a pre-specified number of runtime hours of the failure-caused component replacement; assigning a non-failure label to each data point associated with a failure-caused component replacement and not within the pre-specified number of runtime hours; assigning a non-failure label to each data point associated with a scheduled component replacement; assigning a non-failure label to each data point associated with an actively running instance of the component as yet to be replaced; estimating a failure probability for the component over a pre-specified future runtime; determining a cumulative hazard function for the component based on the failure probability; and generating a cumulative wear-based indicator for the component by executing a regression function based on the cumulative hazard function.

20 Claims, 4 Drawing Sheets

(51) Int. Cl.
*G07C 5/00* (2006.01)
*G06N 7/00* (2006.01)
*G06N 99/00* (2010.01)
*G07C 5/02* (2006.01)
*G05B 23/00* (2006.01)

(52) U.S. Cl.
CPC .............. *G07C 5/006* (2013.01); *G07C 5/008* (2013.01); *G07C 5/02* (2013.01); *G07C 5/0808* (2013.01)

(58) Field of Classification Search
USPC .......................................................... 701/36
See application file for complete search history.

(56) References Cited

U.S. PATENT DOCUMENTS

| | | | |
|---|---|---|---|
| 6,085,154 A | 7/2000 | Leuthausser et al. | |
| 6,330,499 B1 | 12/2001 | Chou et al. | |
| 6,424,930 B1 | 7/2002 | Wood | |
| 6,484,080 B2 | 11/2002 | Breed | |
| 6,748,305 B1 | 6/2004 | Klausner et al. | |
| 6,834,256 B2* | 12/2004 | House | H02P 29/02 318/565 |
| 7,103,460 B1 | 9/2006 | Breed | |
| 7,369,925 B2 | 5/2008 | Morioka et al. | |
| 7,383,165 B2 | 6/2008 | Aragones | |
| 7,418,321 B2* | 8/2008 | Boutin | G05B 23/0251 701/31.7 |
| 7,428,541 B2 | 9/2008 | Houle | |
| 7,474,988 B2 | 1/2009 | Kamisuwa et al. | |
| 7,489,994 B2 | 2/2009 | Isono et al. | |
| 7,567,972 B2 | 7/2009 | Geiselhart et al. | |
| 7,920,944 B2* | 4/2011 | Gould | G07C 5/008 340/425.5 |
| 8,024,084 B2 | 9/2011 | Breed | |
| 8,068,104 B2 | 11/2011 | Rampersad | |
| 8,131,420 B2 | 3/2012 | Lynch et al. | |
| 8,200,389 B1 | 6/2012 | Thompson et al. | |
| 8,224,765 B2 | 7/2012 | Khalak et al. | |
| 8,229,624 B2 | 7/2012 | Breed | |
| 8,229,900 B2 | 7/2012 | Houle | |
| 8,285,438 B2 | 10/2012 | Mylaraswamy et al. | |
| 8,311,858 B2 | 11/2012 | Everett et al. | |
| 8,359,134 B2* | 1/2013 | Maesono | G07C 5/008 307/10.1 |
| 8,374,745 B2 | 2/2013 | Zhang et al. | |
| 8,452,481 B2 | 5/2013 | Ishiko et al. | |
| 8,543,280 B2* | 9/2013 | Ghimire | G07C 5/008 701/29.1 |
| 8,548,671 B2 | 10/2013 | Wong et al. | |
| 8,626,385 B2* | 1/2014 | Humphrey | G07C 5/0841 701/33.7 |
| 8,676,631 B2* | 3/2014 | Basak | G06Q 30/0278 705/26.1 |
| 2003/0095278 A1 | 5/2003 | Schwartz et al. | |
| 2003/0137194 A1* | 7/2003 | White | B60L 3/12 307/10.1 |
| 2005/0065678 A1 | 3/2005 | Smith | |
| 2008/0036487 A1 | 2/2008 | Bradley | |
| 2010/0198771 A1 | 8/2010 | Khalak | |
| 2010/0332201 A1 | 12/2010 | Albarede et al. | |
| 2011/0118905 A1* | 5/2011 | Mylaraswamy | G05B 23/0251 701/3 |
| 2013/0035822 A1 | 2/2013 | Singh et al. | |
| 2014/0336869 A1* | 11/2014 | Bou-Ghannam | G07C 5/00 701/31.9 |

FOREIGN PATENT DOCUMENTS

| | | |
|---|---|---|
| EP | 1110096 B1 | 6/2011 |
| EP | 2730448 A1 | 5/2014 |
| JP | 06331504 A | 12/1994 |
| JP | 07028523 A | 1/1995 |
| JP | 2008052660 A | 3/2008 |

OTHER PUBLICATIONS

IP.com, IBM, Wear-Leveling Technique for EEPROM devices, IPCOM000187712D, Sep. 2009.
Jardine et al. Optimizing a Mine Haul Truck Wheel Motors' Condition Monitoring Program: Use of Proportional Hazard Modeling, Case Study Report, Optimal Maintenance Decision Inc. 2001.
Tian et al. Condition Based Maintenance Optimization Considering Multiple Objectives, Journal of Intelligent Manufacturing 23, 2, 333-340. 2012.
J. Rust, Optimal Replacement of GMC Bus Engines: An Empirical Model of Harold Zurcher, Econometrica 55, 5, 999-1033. 1987.
Zhu et al. Intelligent Maintenance Support System for Syncrude Mining Trucks, 1993 Canadian Conference on Electrical and Computer Engineering, Vancouver, 1217-1220.
Lam et al. Optimal Maintenance—Policies for Deteriorating Systems under Various Maintenance Strategies, IEEE Transactions on Reliability 43, 3, 423-430. 1994.
Wu et al. A Neural Network Integrated Decision Support System for Condition-Based Optimal Predictive Maintenance Policy, IEEE Transactions on Systems, Man, and Cybernetics Part A: System and Humans, 37, 2, 226-236. 2007.
Murphy, Kevin P. Machine Learning: a Probabilistic Perspective, The MIT Press, 2012. Table of Contents. Year Year Year.
Wikipedia, Survival Analysis, Sep. 18, 2014, https://en.wikipedia.org/w/index.php?title=Survival_analysis&oldid=626053780.
Therneau, Terry. Extending the Cox Model, Technical Report No. 58, Nov. 1996.
Hastie et al. The Elements of Statistical Learning: Data Mining, Inference and Prediction, The Mathematical Intelligencer 27.2 (2005): 83-85.
Mannila et al. Discovery of Frequent Episodes in Event Sequences, Data Mining and Knowledge Discovery 1.3 (1997): 259-289.
Bair et al. Prediction by Supervised Principal Components, Journal of the American Statistical Association, 101(473). 2006.
Banjevic et al. A Control-Limit Policy and Software for Condition-Based Maintenance Optimization, INFOR-OTTAWA-, 39(1), 32-50. 2001.
Fox J. Cox Proportional-Hazards Regression for Survival Data, 2002.
Jardine et al. Repairable System Reliability: Recent Developments in CBM Optimization, International Journal of Performability Engineering, 4(3), 205. 2008.
Scholkopf et al. Learning with Kernels, MIT press Cambridge, 2002.
Wu et al. Optimal Replacement in the Proportional Hazards Model with Semi-Markovian Covariate Process and continuous Monitoring, Reliability, IEEE Transactions on, 60(3),580-589. 2011.
Bachetti et al. Survival Trees with Time-Dependent Covariates: Application to Estimating Changes in the Incubation Period of AIDS, Lifetime Data Anal., vol. 1, No. 1, pp. 35-47, 1995.
Breiman et al. Classification and Regression Trees, 1st ed. Chapman and Hall/CRC, 1984.
Friedman et al. Additive Logistic Regression: a Statistical View of Boosting, (With Discussion and a Rejoinder by the Authors), Ann. Stat., vol. 28, No. 2, pp. 337-407, Apr. 2000.
Hothorn et al. Survival Ensembles, Biostat, vol. 7, No. 3, pp. 355-373, Jul. 2006.
Huang et al. Piecewise Exponential Survival Trees with Time-Dependent Covariates, Biometrics, vol. 54. No. 4, pp. 1420-1433, Dec. 1998.
Motorola Inc. et al. New Method and Apparatus for Device Failure Assessment, IPCOM000159857D, Oct. 2007.
IBM, Method of Component Failure Prediction in Large Server and Storage Systems, Jan. 13, IPCOM000191729D, 2010.
An et al. Fatigue Life Prediction Based on Bayesian Approach to Incorporate Field Data into Probability Model, Structural Engineering and Mechanics, vol. 37, No. 4, p. 427-442, 2011.

(56) References Cited

OTHER PUBLICATIONS

Jardine et al. A Review on Machinery Diagnostics and Prognostics Implementing Condition-Based Maintenance, in: Mechanical Systems and Signal Processing, 20, 2006, pp. 1483-1510.
Peng et al. Current Status of Machine Prognostics in Condition-Based Maintenance: a Review, in: International Journal of Advanced Manufacturing Technology, 50, 2010, pp. 297-313.
Lin et al. Filters and Parameter Estimation for a Partially Observable System Subject to Random Failure with continuous-Range Observations, in: Advances in Applied Probability, 36(4), 2004, pp. 1212-1230.
Lin et al. On-Line Parameter Estimation for a Failure-Prone System Subject to Condition Monitoring, in: Journal of Applied Probability, 41(1), 2004, pp. 211-220.
S. Mussi, General Environment for Probabilistic Predictive Monitoring, International Journal of Computers vol. 7, No. 2, 31-49. 2013.
S. Mussi, Probabilistic Predictive Monitoring with Cheerup, International Journal of Computers vol. 6, No. 1, 93-102. 2012.
Liao et al. Predictive Monitoring and Failure Prevention of Vehicle Electronic Components and Sensor Systems, SAE Technical Paper 2006-01-0373, 2006, doi:10.4271/2006-01-0373. 2006.
Jardine et al. Repairable System Reliability: Recent Developments in CBM Optimization, 19th International congress and Exhibition on Condition Monitoring and Diagnostic Engineering Management (COMADEM). Lulea, Sweden, Jun. 2006.
Ataman et al. Knowledge Discovery in Mining Truck Databases, Proceedings. 17th International Mining Congress, The Chamber of Mining Engineers of Turkey, Ankara, 2001.
Hu et al. Early Detection of Mining Truck Failure by Modeling its Operation with Neural Networks Classification Algorithms, Application of Computers and Operations Research in the Minerals Industries, South African Institute of Mining and Metallurgy, 2003.
Ahmad et al. An Overview of Time-Based and Condition-Based Maintenance in Industrial Application, Computers and Industrial Engineering 63, 1, 135-149. 2012.
Jardine et al., "Optimal replacement policy and the structure of software for condition-based maintenance," Journal of Quality in Maintenance Engineering 3, 2, 109-119. 1997.
Jardine et al., Maintenance, replacement, and reliability: theory and applications. CRC Press LLC, 2013.
Zhang, An Introduction to Support Vector Machines and Other Kernel-Based Learning Methods—A Review. AI Magazme vol. 22 No. 2 (2001).
Singer et al., Applied longitudinal data analysis: Modeling change and event occurrence. http://gseacademic.harvard.edu/alda/. Jun. 1, 2005.
Lin et al., "Using principal components in a proportional hazards model with applications in condition-based maintenance," Journal of Operational Research Society 57, 910-919. 2006.

\* cited by examiner

GENERATING CUMULATIVE WEAR-BASED INDICATORS FOR VEHICULAR COMPONENTS

CROSS-REFERENCE TO RELATED APPLICATIONS

This application is a divisional of U.S. patent application Ser. No. 14/498,686, filed Sep. 26, 2014, and incorporated by reference herein.

FIELD OF THE INVENTION

Embodiments of the invention generally relate to information technology, and, more particularly, to vehicle monitoring and maintenance.

BACKGROUND

In an asset-intensive industry, the value of equipment, as a fraction of revenue, is commonly high. The financial impact of managing and maintaining such equipment, therefore, can be significant in such industries. Existing approaches for management of high-value machinery such as, for example, heavy industrial vehicles, include performing periodic maintenance according to a static pre-determined schedule. However, such approaches are based on assumptions that do not apply in many situations.

Accordingly, a need exists for techniques to design and develop a cumulative wear-based indicator of future premature vehicular component failures by combining different sources of data.

SUMMARY

In one aspect of the present invention, techniques for generating cumulative wear-based indicators for vehicular components are provided. An exemplary computer-implemented method can include assigning a failure class label to each data point, from a set of multiple data points derived from measurements associated with a vehicular component across a fleet of multiple vehicles, that (a) is associated with (i) a scheduled vehicular component replacement or (ii) a failure-caused vehicular component replacement, and (b) is within a pre-specified number of runtime hours of (i) the scheduled vehicular component replacement or (ii) the failure-caused vehicular component replacement; assigning a non-failure class label to each data point, from the set of the multiple data points, that (a) is associated with (i) a scheduled vehicular component replacement or (ii) a failure-caused vehicular component replacement, and (b) is not within the pre-specified number of runtime hours of (i) the scheduled vehicular component replacement or (ii) the failure-caused vehicular component replacement; and assigning a non-failure class label to each data point, from the set of the multiple data points, that is associated with an actively running instance of the vehicular component as yet to be replaced. Further, the method additionally includes estimating a failure probability for the vehicular component at each of the multiple data points over a pre-specified future runtime of the vehicular component based on the class label assigned to each of the multiple data points; and determining a cumulative hazard function for the vehicular component based on the failure probability, wherein said cumulative hazard function assesses the amount of accumulated risk that the vehicular component faced from a given start time until the present time. Also, the method includes generating a cumulative wear-based indicator for the vehicular component by executing a regression function at a given time based on (i) the cumulative hazard function, (ii) one or more selected parameters, and (iii) a determination as to whether the vehicular component (a) was previously replaced due to a failure, (b) was previously replaced due to a non-failure scheduled replacement, or (c) is actively running as yet to be replaced.

In another aspect of the invention, an exemplary computer-implemented method can include assigning a failure class label to each data point, from a set of multiple data points derived from measurements associated with a vehicular component across a fleet of multiple vehicles, that (a) is associated with a failure-caused vehicular component replacement, and (b) is within a pre-specified number of runtime hours of the failure-caused vehicular component replacement; assigning a non-failure class label to each data point, from the set of the multiple data points, that (a) is associated with a failure-caused vehicular component replacement, and (b) is not within the pre-specified number of runtime hours of the failure-caused vehicular component replacement; assigning a non-failure class label to each data point, from the set of the multiple data points, that is associated with a scheduled vehicular component replacement; and assigning a non-failure class label to each data point, from the set of the multiple data points, that is associated with an actively running instance of the vehicular component as yet to be replaced. Additionally, the method includes estimating a failure probability for the vehicular component at each of the multiple data points over a pre-specified future runtime of the vehicular component based on the class label assigned to each of the multiple data points. Further, the method additionally includes determining a cumulative hazard function for the vehicular component based on the failure probability, wherein said cumulative hazard function assesses the amount of accumulated risk that the vehicular component has faced from a given start time until the present time; and generating a cumulative wear-based indicator for the vehicular component by executing a regression function at a given time based on (i) the cumulative hazard function, (ii) one or more selected parameters, and (iii) a determination as to whether the vehicular component (a) was previously replaced due to a failure, (b) was previously replaced due to a non-failure scheduled replacement, or (c) is actively running as yet to be replaced.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
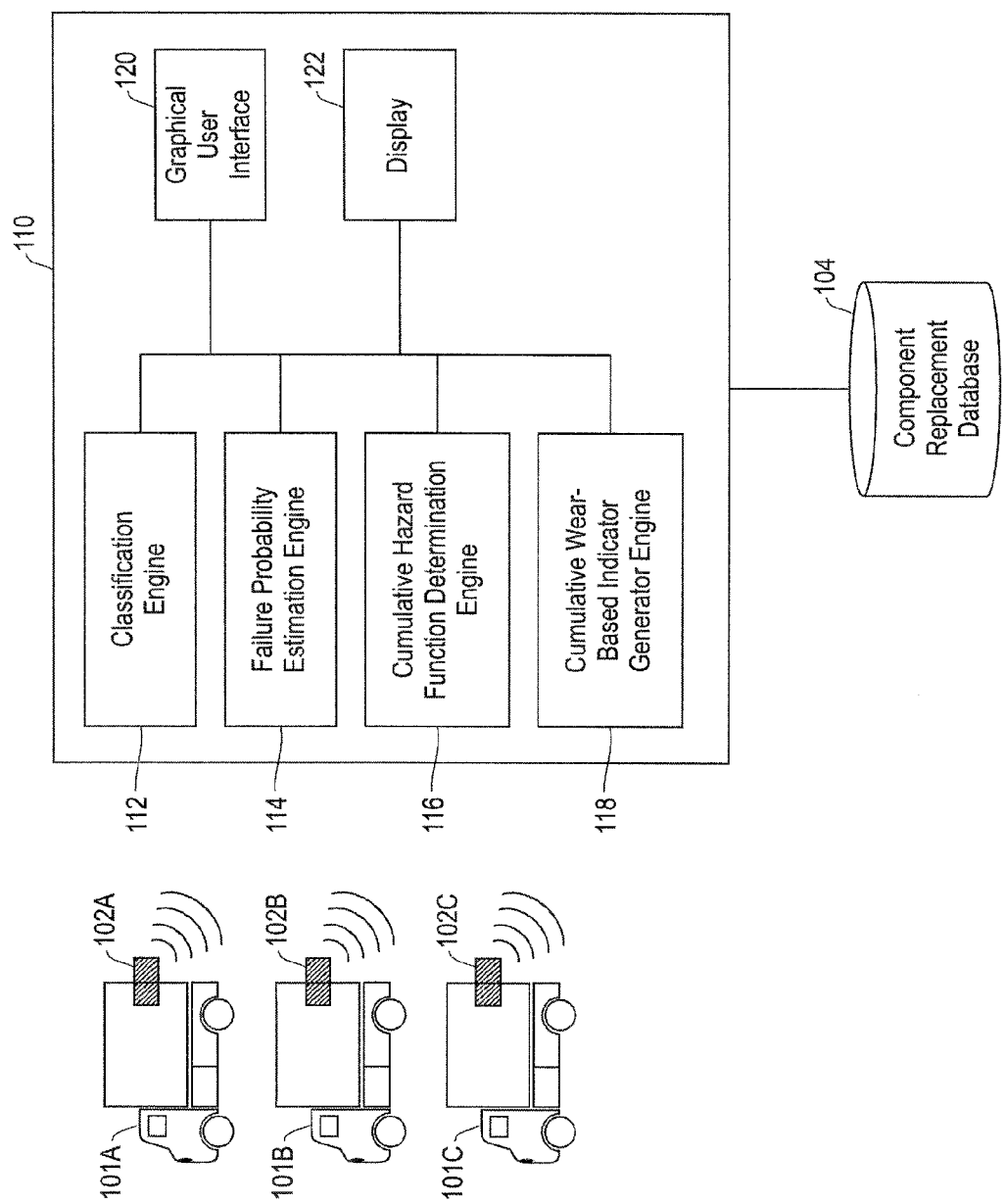
FIG. 1 is a diagram illustrating system architecture, according to an example embodiment of the invention.

As described herein, an aspect of the present invention includes techniques for developing a cumulative wear-based indicator for a vehicular component. At least one embodiment of the invention includes obtaining a set of input time series that represents a history of sample data points, wherein each sample data point includes a combination of measurements taken from a vehicular component across a fleet of vehicles. Such measurements can encompass component data including, for example, total runtime hours, total fuel consumption, total load carried, as well as sensor and replacement event information. Utilizing such data, at least one embodiment of the invention includes generating a non-decreasing (in time) lifetime cumulative wear indicator function for a given vehicular component that is a function of the input time series corresponding to that component, for use as a vehicle maintenance planning tool.

An aspect of the invention includes identifying and utilizing multiple characteristics for implementation in a cumulative wear-based indicator. For instance, such characteristics can be derived from determinations that a cumulative wear-based indicator should be non-decreasing, and convex-shaped (or accelerated shape) over the component runtime.

Additionally, another aspect of the invention includes an individualized cumulative failure probability function (that is, the probability that the component would fail by a given time t). By way of illustration, consider, for each individual component, a hypothetical population of components that share the same history of covariates as a given individual component. At least one embodiment of the invention includes defining a cumulative distribution function of the failure time for the population, referred to herein as the individualized cumulative failure probability function for the component. In addition, the individualized cumulative failure probability function $F_j(t)$ of component j includes the following relationship with the individualized cumulative hazard function $H_j(t)$: $F_j(t)=1-S_j(t)=1-\exp(-H_j(t))$, wherein $S_j(t)$ is the individualized survival probability function (that is, the probability that the component would survive (not fail) up to a given time t). As used herein, the individualized cumulative hazard function $H_j(t)$ (the calculation of which is described further below) assesses the total amount of accumulated risk that the component j has faced from the beginning of a given timeframe until the present time.

Additionally, one or more embodiments of the invention include modelling a wear indicator for a given component using the corresponding individualized cumulative failure probability function. That is, in one or more embodiments of the invention, the wear indicator for a component can be the same as its individualized cumulative failure probability over a given runtime.

In connection with a runtime-based policy, a scheduled replacement time can be selected such that the cumulative failure probability $F(t_p)$ optimizes an economic criterion such as, for example, minimizing the average maintenance cost per unit runtime. Optimizing an economic criterion can be carried out via techniques such as taught, for example, in the U.S. patent application Ser. No. 14/498,693, entitled "Integrating Economic Considerations to Develop a Component Replacement Policy Based on a Cumulative Wear-Based Indicator for a Vehicular Component," filed concurrently herewith and incorporated by reference herein in its entirety. In connection with a wear indicator-based policy for scheduled replacements, a wear indicator threshold value can be selected for and/or applied to the individualized cumulative failure probability functions $F_j(t)$ of components. This is akin to applying a common threshold to the individualized cumulative hazard functions $H_j(t)$. Note, also, that in one or more embodiments of the invention, such individualization for a cumulative failure probability (or cumulative hazard) enables each component to have its own transformed time scale for the given replacement policy.

As referenced above, the individualized cumulative hazard $H_j(t)$ assesses the total amount of accumulated risk that the component j has faced from a given start time until the present time, while the (instantaneous) hazard rate assesses the risk that a component, which has not yet failed, will experience a failure within a unit of runtime. Compared to using the hazard rate in designing a scheduled replacement policy, applying the individualized cumulative hazard $H_j(t)$ carries one or more advantages. For example, in contrast to the hazard rate, the individualized cumulative hazard can capture the accumulated wear over the component runtime. Also, the individualized cumulative hazard is always increasing, whereas the hazard rate may fluctuate up and down over the runtime. Note that the characteristic of monotonically increasing is necessary because the wear indicator is conceptualized as a transformed time scale.

Consider, for example, a data set that includes daily-interval samples. An example embodiment of the invention can include defining the daily hazard $h_j(d)$ on date d for component j based on the total hazard during the daily runtime. That is, daily hazard=hazard rate×daily runtime. Subsequently, such an example embodiment of the invention can include estimating the individualized cumulative hazard by summing all daily hazards until the present time t: $H_j(t)=\Sigma_{all\ d\ in\{d:Meter(j,d)\leq t\}} h_j(d)$, wherein Meter(j,d) is the accumulated runtime hours over days up to and including date d.

Note, also, that the estimated daily hazard depends on a selection of covariates and the model. Also, daily hazard estimates from a desirable model predict component failure near the date of an actual failure time. As noted above, incorrect predictions or premature predictions of failures would lead to a reduction of average runtime. Accordingly, and as additionally detailed below, at least one embodiment of the invention includes identifying the covariates and the model that enable the daily hazard estimates to be convex-shaped and very close to the maximum value (that is, a value of 1) near the date of actual failure time.

In at least one embodiment of the invention, it is desired that only the individualized cumulative hazards satisfy one or more desired characteristics (such as monotonically increasing, high values of $\hat{t}_p$ and $\hat{t}_f$, high wear indicator values on the failure times, etc.) for a given economic criterion. Accordingly, such an embodiment includes designing a wear indicator model as a regression task, wherein the regression target variable is the designed daily hazard $\tilde{h}_j(d)$ specified on any date d for component j as follows:

If the component was failure-replaced, $\tilde{h}_j(d)=(\text{Meter}(j,d)/\text{Meter}(j,T_F(j)))^\alpha$, wherein Meter(j,d) is the total runtime hours up to and including date d, $T_F(j)$ is the finally observed date (or the replacement date), and $\alpha \geq 1$; and If the component was schedule-replaced or actively running (that is, as yet to be replaced), $\tilde{h}_j(d)=\beta(\text{Meter}(j,d)/M_{max})^\alpha$ wherein $M_{max}=\max_i[\text{Meter}(i,T_F(i))]$=the maximum total runtime hours over all components in the data set, and $\beta(\ll 1)$ is a small positive number close to 0 (for example, $\beta$=0.1).

That is, the first equation ($\tilde{h}_j(d)=(\text{Meter}(j,d)/\text{Meter}(j,T_F(j)))^\alpha$) satisfies the condition that failure-replaced components have the maximum value (=1) near the date of an actual failure time, and the second equation ($\tilde{h}_j(d)=\beta(\text{Meter}(j,d)/M_{max})^\alpha$) allows the running/schedule-replaced components to have low values (that is, values of the designed hazard ($\tilde{h}_j(d)$)) over their runtimes.

At least one embodiment of the invention includes generating wear indicator models by performing regression tasks with differently designed daily hazard setups (that is, different $\alpha$ and $\beta$ values), and determining the optimal wear indicator model in terms of the economic optimization criterion estimate by leave-one-component-out cross-validations. Such wear indicator model generation is described in further detail below.

Given an identification of previously replaced components (failure or scheduled replacements) and currently running components (as yet to be replaced) for a component type over a group or fleet of vehicles, as well as the corresponding time-stamped logs of runtime hours (meter), total fuel consumption, total work (load) and sensor events, at least one embodiment of the invention includes generating a wear indicator for the component type using regression techniques.

By way of illustration, suppose that there are a total of J components that were previously replaced or are actively running (as yet to be replaced) for the target component type. For component j (=1, . . . , J), the start date of service is $T_S(j)$, and the final date of observation is $T_F(j)$. Note that the final date of observation is defined as the replaced date for past components and the last observed date for actively running components (as yet to be replaced). For this task, the overall data set includes all points x(j,d) over component j (=1, . . . , J) and date d (=$T_S(j)$, . . . , $T_F(j)$). Accordingly, input data, from the start date of service of component j, can include the following:

Meter(j,d)=accumulated runtime hours over days up to and including date d;

Fuel(j,d)=accumulated fuel consumption over days up to and including date d;

Load(j,d)=accumulated number of loads (that is, total work) over days up to and including date d; and EventCount(j,d)=accumulated number of relevant sensor events for the target component type over days up to and including date d. Such "relevant sensor events" can include, for example, an engine component being connected to sensor events such as engine overheating, over-speeding, etc.

Note that, in an example embodiment of the invention, Meter(j, $T_S(j)$)=0, Fuel(j, $T_S(j)$)=0, Load(j, $T_S(j)$)=0, and EventCount(j, $T_S(j)$)=0. Additionally, in one or more embodiments of the invention, the relevant sensor event types for the component type can be selected using the significance test in a univariate Cox proportional hazard model for each event type. It is to be appreciated by one skilled in the art, however, that one or more embodiments of the invention can encompass and/or implement other techniques such as frequent sequence searching on component failure.

Further, given the parameters such as (i) $N_{smooth}$=positive integer for a smoothing filter, (ii) $N_{fuel}$=positive real threshold value for counting the number of dates with a high daily fuel rate, and (iii) $N_{load}$=positive real threshold value for counting the number of dates with a high daily load rate, at least one embodiment of the invention includes computing intermediate variables as detailed below. The $N_{smooth}$ parameter is used to compute a smoothed value, which can also be referred to as a moving average. For example, as detailed below, in "the average daily meter hours over the past $N_{smooth}$ days on date d," the particular "average daily meter hours" value depends on the given date d.

Note that the intermediate variables are used to calculate features. Also, note that a purpose of $N_{fuel}$ and $N_{load}$ is to count outliers, and while a rule-based outlier detection embodiment is detailed herein, it is to be appreciated by one skilled in the art that embodiments of the invention include a framework for incorporating and/or implementing other anomaly detection algorithms to be applied for effective feature generation.

As such, at least one embodiment of the invention includes computing intermediate variables as follows:

DailyMeter(j,d)=the daily meter hours on date d, also represented as Meter(j,d)−Meter(j,d−1);

DailyFuel(j,d)=the daily fuel consumption on date d, also represented as Fuel(j,d)−Fuel(j,d−1);

DailyLoad(j,d)=the daily number of loads on date d, also represented as Load(j,d)−Load(j,d−1);

SmoothedDailyMeter(j,d)=the average daily meter hours over the past $N_{smooth}$ days on date d;

SmoothedDailyFuel(j,d)=the average daily fuel consumption over the past $N_{smooth}$ days on date d;

SmoothedDailyLoad(j,d)=the average number of loads over the past $N_{smooth}$ days on date d;

DailyFuelRate(j,d)=SmoothedDailyFuel(j,d)/SmoothedDailyMeter(j,d);

DailyLoadRate(j,d)=SmoothedDailyLoad(j,d)/SmoothedDailyMeter(j,d);

HighFuelRateCount(j,d)=the accumulated count of days in which the daily fuel rate>$N_{fuel}$ over days up to and including date d; and HighLoadRateCount(j,d)=the accumulated count of days in which the daily load rate>$N_{load}$ over days up to and including date d.

Before performing the regression task, at least one embodiment of the invention includes performing a classification task to estimate the probability of having the component failure within the next M runtime hours from each date d (that is, the date of each sample). This estimated failure probability can be used as a predictor variable in the regression task. Additionally, it is noted that this failure probability would improve fitting to the designed daily hazard in the regression task as compared to a fitting without the failure probability variable.

In connection with the aforementioned classification task, at least one embodiment of the invention includes computing features and assigning labels to each sample data point x(j,d), as additionally explained below, to model the predicted failure probability. By way of example, features for the classification task can include the following:

HighFuelRateCountPerMeter(j,d)=HighFuelRateCount(j,d)/Meter(j,d);

HighLoadRateCountPerMeter(j,d)=HighLoadRateCount(j,d)/Meter(j,d);

TotalFuelRate(j,d)=Fuel(j,d)/Meter(j,d);
TotalLoadRate(j,d)=Load(j,d)/Meter(j,d); and
TotalEventRate(j,d)=EventCount(j,d)/Meter(j,d).

Additionally, as noted above, one or more embodiments of the invention include assigning the classification label L(j,d) to each point x(j,d) that corresponds to date d for component j. Note that, as used herein, x(j,d) is a multi-dimensional vector of classification features. Historical data of component replacements include multiple types of replacements on the final date of observation, wherein such types can include (i) scheduled replacement and (ii) in-field failure replacement. The goal of the classification task is to estimate the failure probability within the next M runtime hours from each date d. Accordingly, at least one embodiment of the invention, implementing binary classification labels of Failure and No Failure (or non-failure) classes, includes the following labeling scheme (referred to below as Approach1):

For a point x(j,d) on a failure-replaced component j, when Meter(j, d) is within M meter hours of the failure replacement (that is, Meter(j,d)>Meter(j, $T_F(j)$)−M), classification label L(j,d) is assigned a Failure class; otherwise, classification label L(j,d) is assigned a No Failure class;

For any point x(j,d) on a schedule-replaced component j, classification label L(j,d) is assigned a No Failure class; and For any point x(j,d) on running component j, classification label L(j,d) is assigned a No Failure class.

In addition to this labeling scheme, alternatively, at least one embodiment of the invention includes implementing another labeling scheme (referred to below as Approach2), as follows:

For a point x(j, d) from a component j of any replacement (that is, regardless of failure or scheduled replacement), when Meter(j,d) is within M meter hours of the replacement (that is, Meter(j,d)>Runtime(j, $T_F(j)$)−M), classification label L(j,d) is assigned a Failure class; otherwise, classification label L(j, d) is assigned a No Failure class; and For point x(j, d) from currently active (that is, right-censored) component j, classification label L(j, d) is assigned a No Failure class.

An underlying assumption of Approach2, for example, is that scheduled replacement components in the data set would have failed very soon if they had not been replaced at the scheduled replacement runtime hours.

Further, for each component with a scheduled replacement, Approach1 assigns a "No Failure" class to all sample points and a "Failure" class to none; and Approach2 assigns a "Failure" class to all sample points within a pre-specified number (M) of meter hours before a scheduled replacement and a "No Failure" class to all sample points preceding the Failure class.

At least one embodiment of the invention includes testing both labeling schemes and selecting the scheme that generates a better cumulative wear-based indicator in terms of the optimization criterion such as the average maintenance cost per unit runtime. To measure the performance of an example embodiment of the invention, a leave-one-component-out cross validation can be carried out. That is, for each run corresponding to a component j (=1, ..., J), the overall data set is split into (i) a test data set of all points from component j and (ii) a training data set of all points from all J−1 remaining components k ($\neq$j). Additionally, such an embodiment includes generating a wear indicator model based on the training data set only, and computing the wear indicator values on all points in the test data set.

By way of illustration, consider an example embodiment of the invention, wherein the initial parameters include $\alpha$ and $\beta$ (designing daily hazards), $N_{smooth}$, $N_{fuel}$, $N_{load}$ (computing features), and M (modeling failure probability). Further, in such an example embodiment, if there are J runs in total, and in each run corresponding to a component j, the following steps are performed:

Step 1: Divide the overall data set into (i) the test data set of all points from one component j and (ii) the training data set of all points from remaining components.

Step 2: Using only the training data set, perform the classification to build a binary classifier (for example, via applying support vector classification) to compute the to failure probability $P_{failure}(j, d)$ (that is, the probability of being a Failure class) on each point. This estimated probability can be viewed as the failure probability within the next M runtime hours from date d.

Step 3: Design the target variable for the regression task, wherein the regression target variable $\bar{h}_k(d)$ for any component k ($\neq$j) in the training data set should have the desired characteristic of the daily hazard such as being monotonically increasing, convex-shaped, and the maximum value on failure.

Step 4: Using only the training data set, generate the regression model (for example, via applying support vector regression) to target the daily hazard $\bar{h}_k(d)$ with feature variables such as Meter(k,d), Fuel(k,d), Load(k, d), EventCount(k,d) and $P_{failure}(j, d)$.

Step 5: Apply the generated regression model to each point x(j,d) on component j in the testing data set to obtain the estimated daily hazard $h_j(d)$ for each point x(j,d) on component j in the testing data set.

Step 6: Compute the individualized cumulative hazard on component j via $H_j(t)=\Sigma_{all\ d\ in\{d:Meter(j,d)\leq t\}} h_j(d)$.

Step 7: Compute the individualized cumulative failure probability on component j via $F_j(t)=1-\exp(-H_j(t))$.

After all J runs in leave-one-component-out cross validations, the wear indicator values (that is, the individualized cumulative failure probability (F) as output from Step 7) over all components can be determined. Given these values, at least one embodiment of the invention includes performing an optimization task to identify the optimal threshold value for the replacement policy in terms of an economic optimization criterion such as, for example, the average maintenance cost per unit runtime. Note that in a threshold-based replacement policy, a component should be replaced when the wear indicator value reaches a threshold value. Optionally, one or more embodiments of the invention can include using the estimated optimal threshold value to normalize the wear indicator. In such an instance, a component should be replaced when its wear indicator value is 100% of wear.

As detailed herein, parameter selections ($\alpha$, $\beta$, $N_{smooth}$, $N_{fuel}$, $N_{load}$, M) and the choice of the labeling scheme for estimating failure probability on the classification task influence the obtained wear indicator model. Accordingly, an aspect of the invention includes determining the optimal parameters to obtain the best wear indicator model in terms of a given optimization criterion.

FIG. 1 is a diagram illustrating system architecture, according to an example embodiment of the present invention. By way of illustration, FIG. 1 depicts a wear-based indicator generation system 110, which receives input from sensors 102A, 102B and 102C resident on and/or connected to vehicles 101A, 101B and 101C, respectively. By way merely of example, the input from sensors 102A, 102B and 102C can be transmitted wirelessly to the system 110 and/or can be transmitted to the system 110 via a direct electrical connection (for instance, via creating an electrical connection or interface between a given sensor and the system 110 upon detaching the sensor from a given vehicle). Additionally, the system 110 also receives input from a component replacement database 106, as further described herein.

As illustrated in FIG. 1, the wear-based indicator generation system 110 includes a classification engine 112, a failure probability estimation engine 114, a cumulative hazard function determination engine 116, a cumulative wear-based indicator generator engine 118, a graphical user interface 120 and a display 122. As further detailed herein, engines 112, 114, 116 and 118 process multiple forms of data to generate a cumulative wear-based indicator for one or more given vehicular components based on the input provided by sensors 102A, 102B and 102C as well as from database 104. The generated cumulative wear-based indicator for the given vehicular components are then transmitted to the graphical user interface 120 and the display 122 for presentation and/or potential manipulation by a user.

Figure 2:
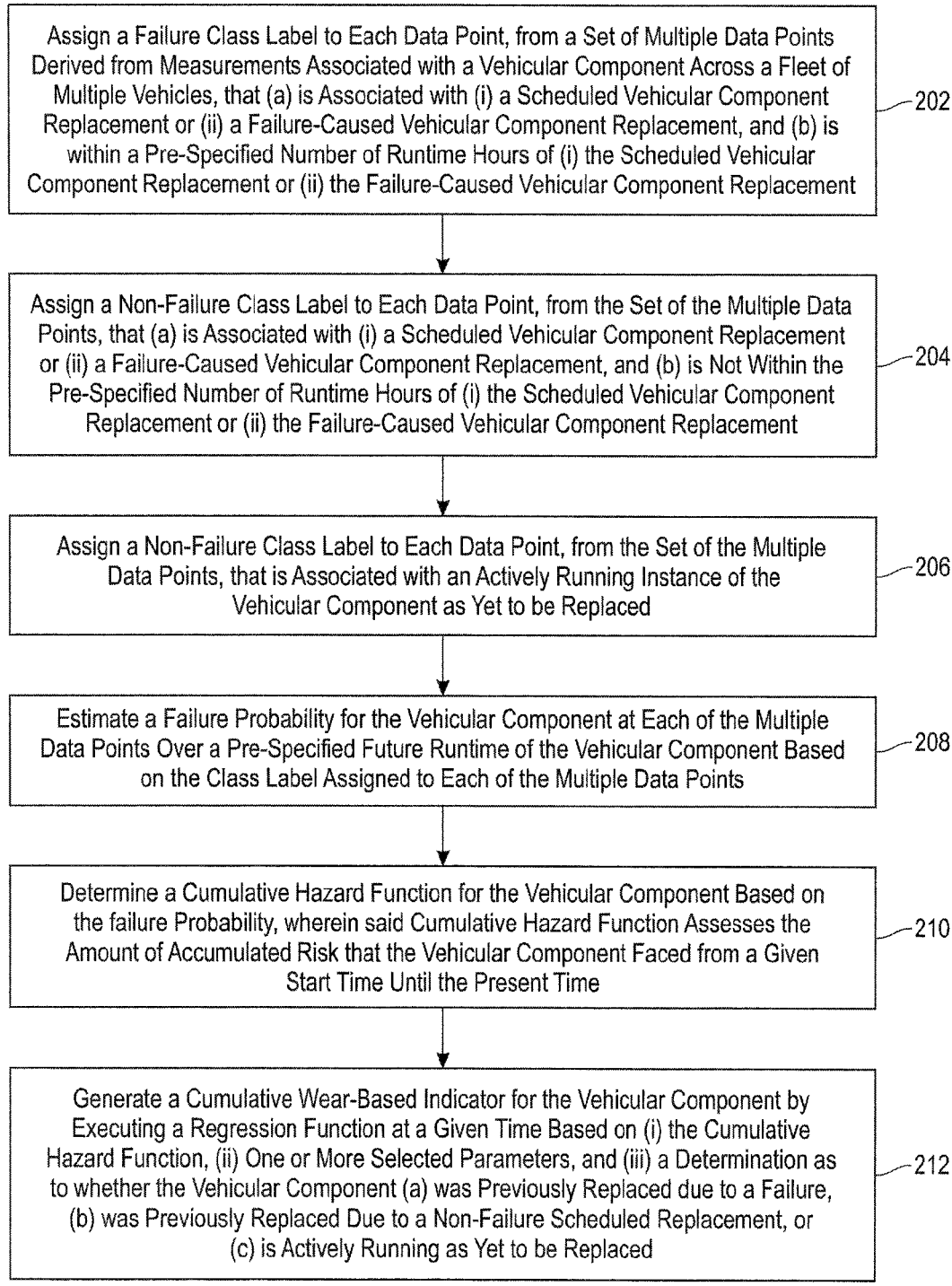
FIG. 2 is a flow diagram illustrating techniques according to an embodiment of the invention.

FIG. 2 is a flow diagram illustrating techniques according to an embodiment of the present invention. Step 202 includes assigning a failure class label to each data point, from a set of multiple data points derived from measurements associated with a vehicular component across a fleet of multiple vehicles, that (a) is associated with (i) a scheduled vehicular component replacement or (ii) a failure-caused vehicular component replacement, and (b) is within a pre-specified number of runtime hours of (i) the scheduled vehicular component replacement or (ii) the failure-caused vehicular component replacement.

Step 204 includes assigning a non-failure class label to each data point, from the set of the multiple data points, that (a) is associated with (i) a scheduled vehicular component replacement or (ii) a failure-caused vehicular component replacement, and (b) is not within the pre-specified number of runtime hours of (i) the scheduled vehicular component replacement or (ii) the failure-caused vehicular component replacement. Step 206 includes assigning a non-failure class label to each data point, from the set of the multiple data points, that is associated with an actively running instance of the vehicular component as yet to be replaced.

Step 208 includes estimating a failure probability for the vehicular component at each of the multiple data points over a pre-specified future runtime of the vehicular component based on the class label assigned to each of the multiple data points. Techniques that can be used to carry out this estimation step can include, for example, support vector classification (SVC) techniques and/or support vector regression (SVR) techniques.

Step 210 includes determining a cumulative hazard function for the vehicular component based on the failure probability, wherein said cumulative hazard function assesses the amount of accumulated risk that the vehicular component faced from a given start time until the present time. The failure probability ($F_j(t)$) for the vehicular component relates to the cumulative hazard function ($H_j(t)$) for the vehicular component such that $F_j(t)=1-S_j(t)=1-\exp(-H_j(t))$ wherein $S_j(t)$ is a survival probability function for the vehicular component j at time t.

Additionally, in at least one embodiment of the invention, the cumulative hazard function is based on an aggregate of multiple hazard function values of a given temporal interval across a given timeframe. By way of example, the given temporal interval can be one day, and in such an embodiment of the invention, each of the multiple hazard functions of a one day temporal interval is defined as the total hazard ($h_j(d)$) during the daily runtime on day d for vehicular component j. Also, in such an embodiment, the aggregate ($H_j(t)$) of multiple hazard functions of a one day temporal interval across the given timeframe comprises $H_j(t)=\Sigma_{all\ d\ in\{d:Meter(j,d)\leq t\}} h_j(d)$, wherein Meter(j,d) represents the accumulated runtime hours over days up to and including date d, and wherein the given timeframe comprises a given start date through time t.

Step 212 includes generating a cumulative wear-based indicator for the vehicular component by executing a regression function at a given time based on (i) the cumulative hazard function, (ii) one or more selected parameters, and (iii) a determination as to whether the vehicular component (a) was previously replaced due to a failure, (b) was previously replaced due to a non-failure scheduled replacement, or (c) is actively running as yet to be replaced. The selected parameters can include (i) the accumulated fuel consumption over a given time period, (ii) the accumulated amount of work over the given time period, and/or (iii) the accumulated number of sensor events for a target component type that encompasses the vehicular component over the given time period. It is also to be appreciated by one skilled in the art that one or more additional parameters can be encompassed by one or more embodiments of the invention.

The given time can include a given date, wherein said vehicular component was previously replaced due to a failure, and wherein said executing the regression function ($\tilde{h}_j(d)$) comprises calculating $\tilde{h}_j(d)=(\text{Meter}(j,d)/\text{Meter}(j,T_F(j)))^\alpha$, wherein Meter(j,d) represents the total number of runtime hours up to and including date d, $T_F(j)$ is the date that the vehicular component was previously replaced due to a failure, and $\alpha \geq 1$. Additionally, the given time can include a given date, wherein said vehicular component was previously replaced due to a non-failure scheduled replacement, and wherein said executing the regression function ($\tilde{h}_j(d)$) includes calculating $\tilde{h}_j(d)=\beta(\text{Meter}(j,d)/M_{max})^\alpha$, wherein $M_{max}=\max_i[\text{Meter}(i, T_F(i))]$, which represents the maximum total number of runtime hours over all vehicular components in a given data set (for instance, the set of multiple data points), and $\beta$ represents a positive number between zero and one. Further, the given time can include a given date, wherein said vehicular component is actively running as yet to be replaced, and wherein said executing the regression function ($\tilde{h}_j(d)$) includes calculating $\tilde{h}_j(d)-\beta(\text{Meter}(j,d)/M_{max})^\alpha$, wherein $M_{max}=\max_i[\text{Meter}(i, T_F(i))]$, which represents the maximum total number of runtime hours over all vehicular components in a given data set, and $\beta$ represents a positive number between zero and one.

The techniques depicted in FIG. 2 can also include generating multiple cumulative wear-based indicators for the vehicular component by executing multiple regression functions, wherein each of the multiple regression functions comprises a distinct combination of the one or more selected parameters. Additionally, the techniques depicted in FIG. 2 can further include identifying the cumulative wear-based indicator from the multiple cumulative wear-based indicators that optimizes a given criterion.

Also, the techniques depicted in FIG. 2 can include obtaining at least one input time series pertaining to the vehicular component across the fleet of vehicles, wherein each input time series includes data points from the set of multiple data points derived from the measurements associated with the vehicular component across the fleet of multiple vehicles.

Figure 3:
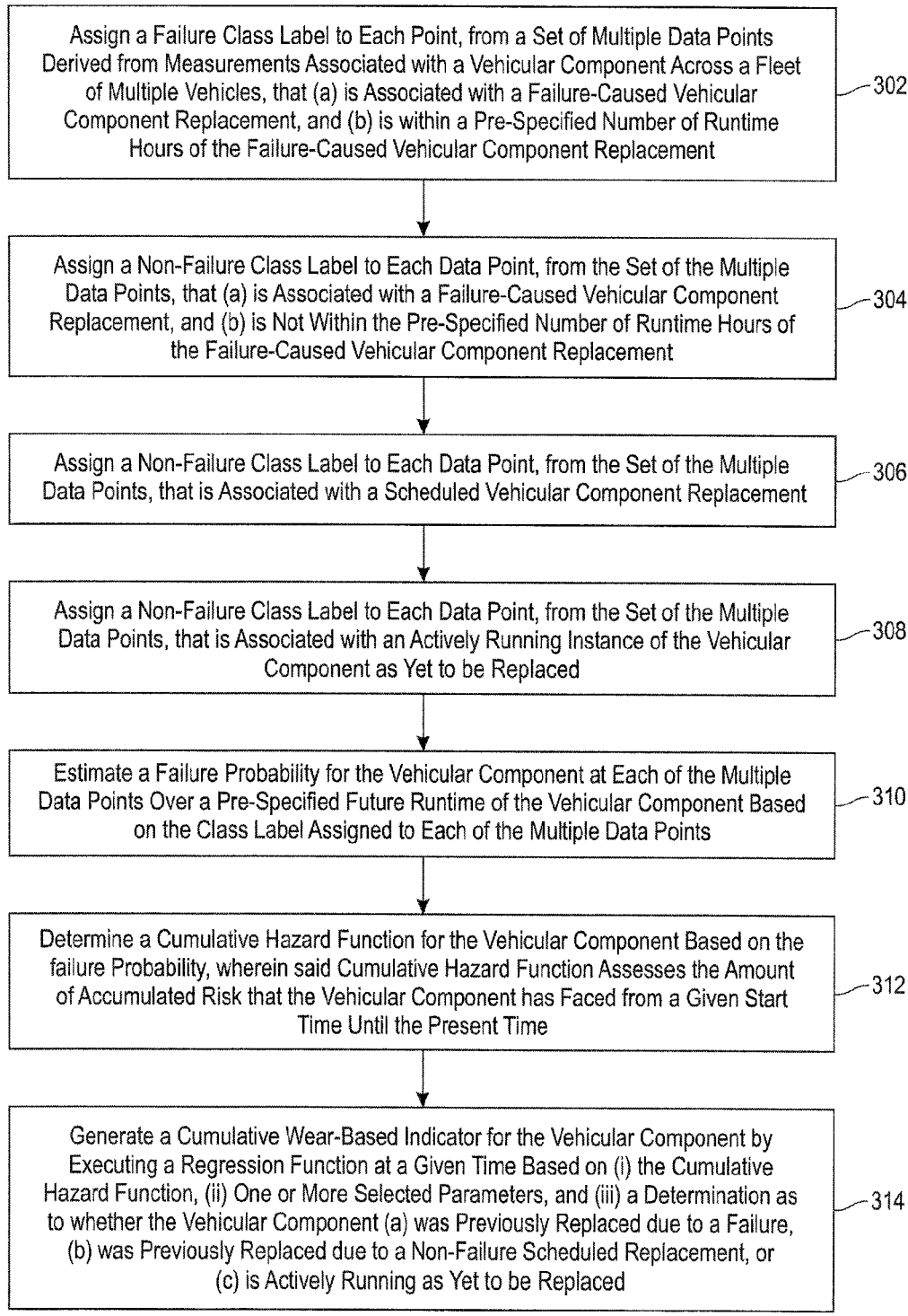
FIG. 3 is a flow diagram illustrating techniques according to an embodiment of the invention.

FIG. 3 is a flow diagram illustrating techniques according to an embodiment of the invention. Step 302 includes assigning a failure class label to each data point, from a set of multiple data points derived from measurements associated with a vehicular component across a fleet of multiple vehicles, that (a) is associated with a failure-caused vehicular component replacement, and (b) is within a pre-specified number of runtime hours of the failure-caused vehicular component replacement. Step 304 includes assigning a non-failure class label to each data point, from the set of the multiple data points, that (a) is associated with a failure-caused vehicular component replacement, and (b) is not within the pre-specified number of runtime hours of the failure-caused vehicular component replacement. Step 306 includes assigning a non-failure class label to each data point, from the set of the multiple data points, that is associated with a scheduled vehicular component replacement. Step 308 includes assigning a non-failure class label to each data point, from the set of the multiple data points, that is associated with an actively running instance of the vehicular component as yet to be replaced.

Step 310 includes estimating a failure probability for the vehicular component at each of the multiple data points over a pre-specified future runtime of the vehicular component based on the class label assigned to each of the multiple data points. Step 312 includes determining a cumulative hazard function for the vehicular component based on the failure probability, wherein said cumulative hazard function assesses the amount of accumulated risk that the vehicular component has faced from a given start time until the present time. Step 314 includes generating a cumulative wear-based indicator for the vehicular component by executing a regression function at a given time based on (i) the cumulative hazard function, (ii) one or more selected parameters, and (iii) a determination as to whether the vehicular component (a) was previously replaced due to a failure, (b) was previously replaced due to a non-failure scheduled replacement, or (c) is actively running as yet to be replaced.

The techniques depicted in FIG. 2 and FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
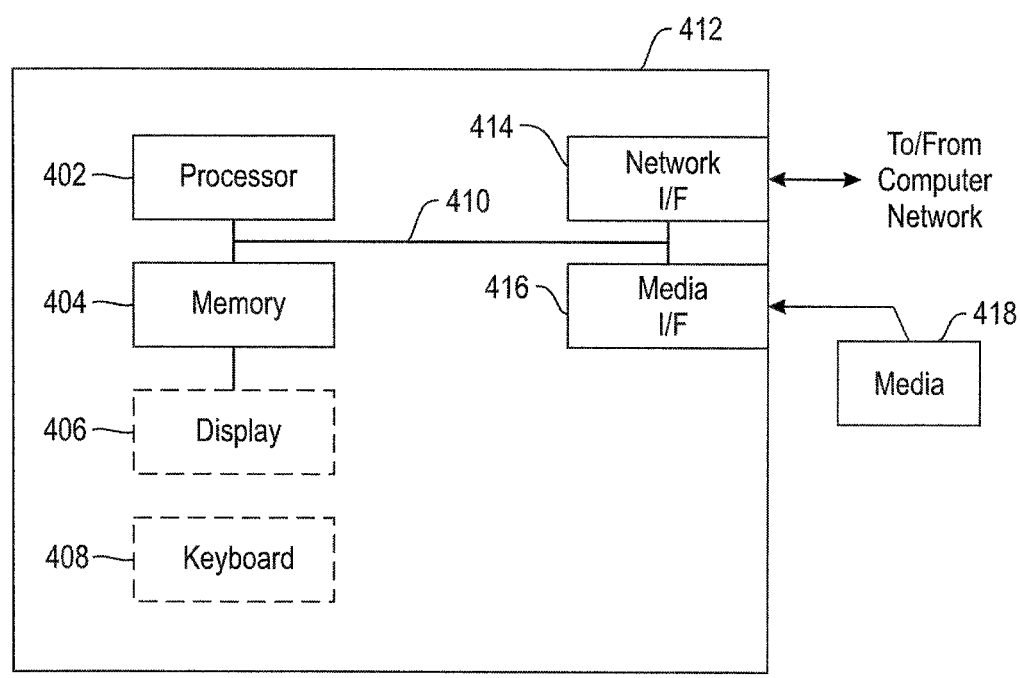
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, generating a non-decreasing cumulative wear indicator function for a given vehicular component that is a function of an input time series corresponding to the component.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the following steps:

assigning a failure class label to each data point, from a set of multiple data points derived from measurements associated with a vehicular component across a fleet of multiple vehicles, that (a) is associated with a failure-caused vehicular component replacement, and (b) is within a pre-specified number of runtime hours of the failure-caused vehicular component replacement;

assigning a non-failure class label to each data point, from the set of the multiple data points, that (a) is associated with a failure-caused vehicular component replacement, and (b) is not within the pre-specified number of runtime hours of the failure-caused vehicular component replacement;

assigning a non-failure class label to each data point, from the set of the multiple data points, that is associated with a scheduled vehicular component replacement;

assigning a non-failure class label to each data point, from the set of the multiple data points, that is associated with an actively running instance of the vehicular component as yet to be replaced;

estimating a failure probability for the vehicular component at each of the multiple data points over a pre-specified future runtime of the vehicular component based on the class label assigned to each of the multiple data points;

determining a cumulative hazard function for the vehicular component based on the failure probability, wherein said cumulative hazard function assesses the amount of accumulated risk that the vehicular component has faced from a given start time until the present time; and generating a cumulative wear-based indicator for the vehicular component by executing a regression function at a given time based on (i) the cumulative hazard function, (ii) one or more selected parameters, and (iii) a determination as to whether the vehicular component (a) was previously replaced due to a failure, (b) was previously replaced due to a non-failure scheduled replacement, or (c) is actively running as yet to be replaced;

wherein the steps are carried out by at least one computing device.

2. The method of claim 1, comprising:

obtaining at least one input time series pertaining to the vehicular component across the fleet of multiple vehicles, wherein each input time series comprises data points from the set of multiple data points derived from the measurements associated with the vehicular component across the fleet of multiple vehicles.

3. The method of claim 1, wherein said failure probability ($F_j(t)$) for the vehicular component relates to said cumulative hazard function ($H_j(t)$) for the vehicular component such that $F_j(t)=1-S_j(t)=1-\exp(-H_j(t))$ wherein $S_j(t)$ is a survival probability function for the vehicular component j at time t.

4. The method of claim 1, wherein said cumulative hazard function is based on an aggregate of multiple hazard function values of a given temporal interval across a given timeframe.

5. The method of claim 4, wherein said given temporal interval is one day, and wherein each of said multiple hazard functions of a one day temporal interval is defined as the total hazard ($h_j(d)$) during the daily runtime on day d for vehicular component j.

6. The method of claim 5, wherein the aggregate ($H_j(t)$) of multiple hazard functions of a one day temporal interval across the given timeframe comprises $H_j(t)=\Sigma_{\text{all } d \text{ in } \{d:Meter(j,d)\leq t\}} h_j(d)$, wherein Meter(j,d) represents the accumulated runtime hours over days up to and including date d, and wherein the given timeframe comprises a given start date through time t.

7. The method of claim 1, wherein said given time comprises a given date, wherein said vehicular component was previously replaced due to a failure, and wherein said executing the regression function ($\tilde{h}_j(d)$) comprises calculating $\tilde{h}_j(d)=(Meter(j, d)/Meter(j, T_F(j)))^\alpha$ wherein Meter(j, d) represents the total number of runtime hours up to and including date d, $T_F(j)$ is the date that the vehicular component was previously replaced due to a failure, and $\alpha \geq 1$.

8. The method of claim 1, wherein said given time comprises a given date, wherein said vehicular component was previously replaced due to a non-failure scheduled replacement, and wherein said executing the regression function ($\tilde{h}_j(d)$) comprises calculating $\tilde{h}_j(d)=\beta(\text{Meter}(j, d)/M_{max})^\alpha$, wherein $M_{max}=\max_i[\text{Meter}(i, T_F(i))]$, which represents the maximum total number of runtime hours over all vehicular components in the set of multiple data points, and $\beta$ represents a positive number between zero and one.

9. The method of claim 1, wherein said given time comprises a given date, wherein said vehicular component is actively running as yet to be replaced, and wherein said executing the regression function ($\tilde{h}_j(d)$) comprises calculating $\tilde{h}_j(d)=\beta(\text{Meter}(j, d)/M_{max})^\alpha$, wherein $M_{max}=\max_i[\text{Meter}(i, T_F(i))]$, which represents the maximum total number of runtime hours over all vehicular components in the set of multiple data points, and represents a positive number between zero and one.

10. The method of claim 1, wherein the one or more selected parameters comprise (i) the accumulated fuel consumption over a given time period, (ii) the accumulated amount of work over the given time period, and/or (iii) the accumulated number of sensor events for a target component type that encompasses the vehicular component over the given time period.

11. The method of claim 1, comprising:
generating multiple cumulative wear-based indicators for the vehicular component by executing multiple regression functions, wherein each of the multiple regression functions comprises a distinct combination of the one or more selected parameters; and
identifying the cumulative wear-based indicator from the multiple cumulative wear-based indicators that optimizes a given criterion.

12. A computer program product, the computer program product comprising a non-transitory computer readable storage medium having program instructions embodied therewith, the program instructions executable by a computing device to cause the computing device to:
assign a failure class label to each data point, from a set of multiple data points derived from measurements associated with a vehicular component across a fleet of multiple vehicles, that (a) is associated with a failure-caused vehicular component replacement, and (b) is within a pre-specified number of runtime hours of the failure-caused vehicular component replacement;
assign a non-failure class label to each data point, from the set of the multiple data points, that (a) is associated with a failure-caused vehicular component replacement, and (b) is not within the pre-specified number of runtime hours of the failure-caused vehicular component replacement;
assign a non-failure class label to each data point, from the set of the multiple data points, that is associated with a scheduled vehicular component replacement;
assign a non-failure class label to each data point, from the set of the multiple data points, that is associated with an actively running instance of the vehicular component as yet to be replaced;
estimate a failure probability for the vehicular component at each of the multiple data points over a pre-specified future runtime of the vehicular component based on the class label assigned to each of the multiple data points;
determine a cumulative hazard function for the vehicular component based on the failure probability, wherein said cumulative hazard function assesses the amount of accumulated risk that the vehicular component has faced from a given start time until the present time; and
generate a cumulative wear-based indicator for the vehicular component by executing a regression function at a given time based on (i) the cumulative hazard function, (ii) one or more selected parameters, and (iii) a determination as to whether the vehicular component (a) was previously replaced due to a failure, (b) was previously replaced due to a non-failure scheduled replacement, or (c) is actively running as yet to be replaced.

13. The computer program product of claim 12, wherein said failure probability ($F_j(t)$) for the vehicular component relates to said cumulative hazard function ($H_j(t)$) for the vehicular component such that $F_j(t)=1-S_j(t)=1-\exp(-H_j(t))$ wherein $S_j(t)$ is a survival probability function for the vehicular component j at time t.

14. The computer program product of claim 12, wherein said cumulative hazard function is based on an aggregate of multiple hazard function values of a given temporal interval across a given timeframe.

15. The computer program product of claim 14, wherein said given temporal interval is one day, and wherein each of said multiple hazard functions of a one day temporal interval is defined as the total hazard ($h_j(d)$) during the daily runtime on day d for vehicular component j.

16. The computer program product of claim 15, wherein the aggregate ($H_j(t)$) of multiple hazard functions of a one day temporal interval across the given timeframe comprises $H_j(t)=\Sigma_{all\ d\ in\ \{d:\text{Meter}(j,d)\le t\}} h_j(d)$, wherein $\text{Meter}(j,d)$ represents the accumulated runtime hours over days up to and including date d, and wherein the given timeframe comprises a given start date through time t.

17. The computer program product of claim 12, wherein said given time comprises a given date, wherein said vehicular component was previously replaced due to a failure, and wherein said executing the regression function ($\tilde{h}_j(d)$) comprises calculating $\tilde{h}_j(d)=(\text{Meter}(j, d)/\text{Meter}(j, T_F(j)))^\alpha$ wherein $\text{Meter}(j,d)$ represents the total number of runtime hours up to and including date d, $T_F(j)$ is the date that the vehicular component was previously replaced due to a failure, and $\alpha \ge 1$.

18. The computer program product of claim 12, wherein said given time comprises a given date, wherein said vehicular component was previously replaced due to a non-failure scheduled replacement, and wherein said executing the regression function ($\tilde{h}_j(d)$) comprises calculating $\tilde{h}_j(d)=\beta(\text{Meter}(j,d)/M_{max})^\alpha$ wherein $M_{max}=\max_i[\text{Meter}(i, T_F(i))]$, which represents the maximum total number of runtime hours over all vehicular components in the set of multiple data points, and $\beta$ represents a positive number between zero and one.

19. The computer program product of claim 12, wherein said given time comprises a given date, wherein said vehicular component is actively running as yet to be replaced, and wherein said executing the regression function ($\tilde{h}_j(d)$) comprises calculating $\tilde{h}_j(d)=\beta(\text{Meter}(j, d)/M_{max})^\alpha$, wherein $M_{max}=\max_i[\text{Meter}(i,T_F(i))]$, which represents the maximum total number of runtime hours over all vehicular components in the set of multiple data points, and $\beta$ represents a positive number between zero and one.

20. The computer program product of claim 12, wherein the one or more selected parameters comprise (i) the accumulated fuel consumption over a given time period, (ii) the accumulated amount of work over the given time period, and/or (iii) the accumulated number of sensor events for a target component type that encompasses the vehicular component over the given time period.

\* \* \* \* \*